US010924363B2

(12) United States Patent
Pan et al.

(10) Patent No.: US 10,924,363 B2
(45) Date of Patent: Feb. 16, 2021

(54) METHOD AND SYSTEM FOR SECURE RESOURCE MANAGEMENT UTILIZING BLOCKCHAIN AND SMART CONTRACTS

(71) Applicant: The Curators of the University of Missouri, Columbia, MO (US)

(72) Inventors: Jianli Pan, Columbia, MO (US); Jianyu Wang, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 0 days.

(21) Appl. No.: 16/383,291

(22) Filed: Apr. 12, 2019

(65) Prior Publication Data

US 2019/0319861 A1 Oct. 17, 2019

Related U.S. Application Data

(60) Provisional application No. 62/657,387, filed on Apr. 13, 2018, provisional application No. 62/681,936, filed on Jun. 7, 2018.

(51) Int. Cl.
*G06F 15/16* (2006.01)
*H04L 12/24* (2006.01)
*G06Q 20/06* (2012.01)
*H04L 9/06* (2006.01)
*G06Q 20/40* (2012.01)

(52) U.S. Cl.
CPC ..... *H04L 41/5096* (2013.01); *G06Q 20/0658* (2013.01); *G06Q 20/405* (2013.01); *H04L 9/0637* (2013.01); *H04L 41/5006* (2013.01); *H04L 41/5019* (2013.01)

(58) Field of Classification Search
CPC .............. G06Q 20/0658; G06Q 20/405; H04L 2209/38; H04L 41/0896; H04L 41/5006; H04L 41/5019; H04L 41/5096; H04L 9/0637; H04L 9/3239
See application file for complete search history.

(56) References Cited

U.S. PATENT DOCUMENTS

2018/0337769 A1* 11/2018 Gleichauf ............. H04L 9/0637
2019/0188706 A1*  6/2019 McCurtis ............... G06Q 20/40
2019/0349426 A1* 11/2019 Smith .................... H04L 69/22

OTHER PUBLICATIONS

Christidis et al., "Blockchains and Smart Contracts for the Internet of Things", IEEE Access, Jun. 3, 2016, pp. 2292-2303, vol. 4.
(Continued)

*Primary Examiner* — Normin Abedin
(74) *Attorney, Agent, or Firm* — Thompson Coburn LLP; Kevin M. Kercher

(57) ABSTRACT

This disclosure relates to a resource management system of a computing network. The design of the resource management system is an edge-Internet of Things (IoT) framework based on blockchain and smart contracts. The resource management system integrates a permissioned blockchain to link the edge cloud resources with each account for an IoT device, resource usage, and behavior of the IoT device. The resource management system uses credit-based resource management to control the resource of the IoT device that can be obtained from the edge server. Smart contracts are used to regulate behavior of the IoT device and enforce policies.

20 Claims, 10 Drawing Sheets

(56) References Cited

OTHER PUBLICATIONS

Dorri et al., "Blockchain for IoT Security and Privacy: the Case Study of a Smart Home", 2nd IEEE Pervasive Computing and Communications Workshop on Security Privacy and Trust in the Internet of Things, 2017, 2017, 6 pages.
Xiong et al., "Edge Computing Resource Management and Pricing for Mobile Blockchain", ArXiv, 2017, 17 pages.
Xiong et al., "When Mobile Blockchain Meets Edge Computing", rXiv, 2018, pp. 1-16.
Zhang et al., "Smart Contract-Based Access Control for the Internet of Things", ArXiv, 2018, pp. 1-11.

* cited by examiner

| Device Specifications | Value Units | Examples |
|---|---|---|
| account address | string | 0xc968cfa8019d (hash value) |
| network port | int | 42024 |
| input/output data | string | video, audio, text |
| bandwidth request | double | [min Value, max Value] |
| CPU request | double | [min Value, max Value] |
| memory request | double | [min Value, max Value] |
| storage request | double | [min Value, max Value] |
| MAC address | string | 00-14-22-01-23-45 |
| priority* | int | 1/2/3/4 |
| coin balance* | double | 200.00 |
| credit* | int | 100 |
| isBlocked* | bool | false |
| isRegistered* | bool | false |
| last request id* | string | 0xcf30613db6a84 (hash value) |

FIG. 8

METHOD AND SYSTEM FOR SECURE RESOURCE MANAGEMENT UTILIZING BLOCKCHAIN AND SMART CONTRACTS

CROSS-REFERENCE AND PRIORITY CLAIM TO RELATED PATENT APPLICATIONS

This non-provisional patent application claims priority to U.S. Provisional Patent Application No. 62/657,387, filed Apr. 13, 2018, and entitled "Method and System for Secure Resource Management of IoT Utilizing Blockchain and Smart Contracts", and additionally claims priority to U.S. Provisional Patent Application No. 62/681,936, filed Jun. 7, 2018, and entitled "Edge-IoT Framework Based on Blockchain and Smart Contracts and Associated Method of Use", the entire disclosures of each are incorporated herein by reference.

STATEMENT REGARDING FEDERALLY SPONSORED RESEARCH OR DEVELOPMENT

This invention was made with government support under Grant No. NSA H98230-17-1-0393 awarded by the National Security Agency and under Grant No. NASA: NNX15AK38A awarded by the National Aeronautics and Space Administration. The U.S. Government may have certain rights in the invention.

INTRODUCTION

The Internet is evolving rapidly toward a new age named "Internet of Things" (IoT), which will potentially network billions or even trillions of devices. It is predicted that more than 50 billion devices will connect to Internet by the year 2025. It will inevitably change the way we live and work with smart houses, workspaces, transport and even cities on the horizon. However, such trends create significant scalability and security challenges. These devices will generate a massive size of data volume at a very high speed. It is only a matter of time when it becomes simply impossible to transfer all the data to the remote data centers for further processing, as what is currently happening in the existing cloud computing model. Moreover, some of the IoT applications may require fast response and low end-to-end latency such as augmented reality (AR) or virtual reality (VR), speech recognition, computer vision, and self-driving applications. Such requirements will also make the current cloud computing model helpless due to the relatively long distance between the IoT devices and the remote data centers. In numerous cases, the resource "poor" IoT devices need assistance in computation or storage that is geographically closer to them.

IoT devices are relatively "weak" and "vulnerable". "Weak" means that the IoT devices are usually with limited capabilities and it will become very common for the resource-poor IoT devices to offload tasks to the resource-rich edge computing platform for fast processing. In other words, the edge computing platform needs to allocate resources carefully for different applications and among different IoT devices in a specific application to serve as many devices as possible and guarantee service quality. Examples include the majority of the smart phone applications and smart home devices such as Google Home and Amazon Echo. However, the existing centralized cloud computing model is very difficult to scale with the projected massive number of devices due to the large amount of generated data and the relatively long distance between IoT devices and clouds. To make this happen, the edge servers need to differentiate service priorities and resource intensity accordingly. On the other hand, due to their lack of computation, storage, and battery resources in providing better security, the IoT devices are also "vulnerable" to defend against malicious attacks and could be relatively easily controlled by malicious hackers. This is aggravated by the fact that most of the cheap IoT devices are made with very limited security capabilities, and very poor or even no technical upgrading or maintenance services. Such vulnerabilities could make the IoT devices easily controlled and turned into malicious nodes by hackers to form a botnet and initiate large scale Distributed Denial-of-Service (DDoS) attacks. This usually leads to large amount of economic losses.

Edge computing is an emerging direction to provide solutions for the IoT scalability issue. It pushes more computing, networking, storage, and intelligence resources closer to the IoT devices, and provides various benefits such as faster response, handling big data, reducing backbone network traffic, and providing edge intelligence. Typical benefited IoT applications include emergency response, augmented reality, video surveillance, speech recognition, computer vision, and self-driving.

Many works have also been devoted to IoT security. Traditional general-purpose security solutions are not suitable to run on the IoT devices due to the capability constraints. A typical compromise is to use lightweight IoT security protocols. Perimeter-based security through firewall does not require running additional software on IoT devices but cannot prevent internal attacks and has been proved ineffective in securing billions of weak devices. Compared with perimeter-based trust, zero-trust approaches are proved to be more effective and seem promising. Direct or indirect system-level security approaches, which do not put intensive security-related loads on IoT devices and do not assume the IoT devices being well maintained, and if enabled with a zero-trust or trustless capabilities, are much needed. Blockchain combined with smart contracts enable a trustless environment and are recently attracting more attention due to unique features such as data/transactions persistence, tampering resistance, validity, traceability, and distributed fault tolerance.

To solve these problems and better support the "weak" and "vulnerable" IoT devices, the inventors developed a new solution by way of a resource management system labeled "Edge Chain" in the Edge-IoT framework utilizing blockchain and smart contracts for better device management and resource allocation. The new framework involves distributed edge servers and IoT devices equipped with blockchain and smart contract capabilities. The blockchain module records all the activities and transactions into the blockchain automatically so that any potential malicious and suspicious behaviors from the IoT devices could be captured and recorded. The mining function is implemented in the edge servers that have ample resources. The inventors propose to create a private "credit coin" system based on the Ethereum platform to control the resource usage of the IoT devices. Smart contracts are created on top of the blockchain to handle the transaction coins, manage the behaviors of each IoT device, and to enforce agreed user policies.

Further features and advantages of the disclosed embodiments, as well as the structure and operation of various elements of the disclosed embodiments, are described in detail below with reference to the accompanying drawings.

BRIEF DESCRIPTION OF THE DRAWINGS

The accompanying drawings, which are incorporated in and form a part of the specification, illustrate, but are not limited to, the disclosed embodiments and together with the description, serve to explain certain inventive principles. In the drawings:

FIG. 8 shows a table of device registration attributes stored by the resource management system on an edge server according to an embodiment of the disclosure;

DETAILED DESCRIPTION OF EXAMPLE EMBODIMENTS

Figure 1:
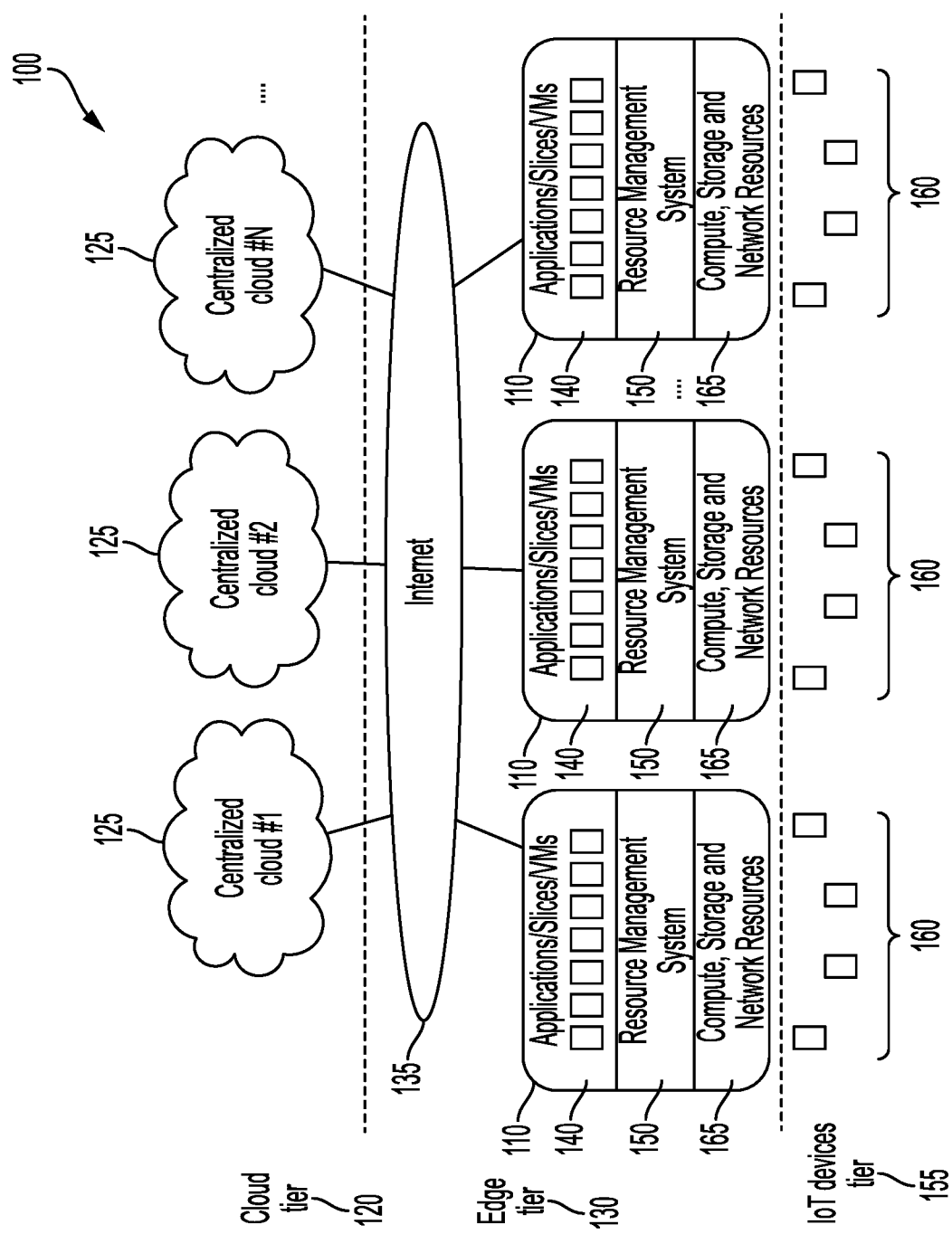
FIG. 1 illustrates an example cloud computing network containing an edge server according to an embodiment of the disclosure.

Referring to the accompanying drawings, FIG. 1 illustrates an example cloud computing network 100 containing an edge server 110. A cloud tier 120 housing a plurality of centralized clouds 125 of computers, servers, and computing resources is located at the top of level of the tiered system. Below the cloud tier 120, the edge tier 130 is present. Within the edge tier 130 are the plurality of edge servers 110 connected to the internet 135. Through this internet 135 connection, the edge servers 110 can communicate with the plurality of centralized clouds 125 to run applications, divide usage resources, and allocate program usage. Each edge server 110 may run and execute multiple applications, or instances of virtual machines 140. Also stored within these edge servers 110 is the resource management system 150 of the edge tier 130 of the cloud computing architecture. The resource management system 150 of the edge servers 110 can allocate program usage and device usage by the IoT device tier 155 and the plurality of IoT devices 160 within this tier connected to the edge server 110. The edge servers 110 work to provide distribution computation, storage, and competing network resources 165 by the plurality of IoT devices 160 connected to a specific edge server 110.

Edge server 110 will push more resources closer to the IoT devices 160 where the data is generated and local computing, storage and networking resources are virtualized in an edge cloud platform and shared by various IoT applications launched in the edge server 110. The local computing, storage and networking resources are virtualized in an edge cloud platform and are shared by various IoT applications launched in it. Such a new edge tier 130 in the form of a cloud stands between the cloud tier 120 and the IoT device tier 155 to provide better data handling and application performance to the users. It is envisioned that such an integrated "Edge-IoT" architecture would be the foundation for future IoT applications in providing various applications such as smart home, smart city, smart transportation, etc.

FIG. 1 is a simple example of a standalone edge server 110 having a resource management system 150 platform that is deployed in a smart home scenario. In the real use case, multiple such Edge Chaining boxes, e.g., edge servers 110, could work in a fully distributed environment such as smart campus and smart cities, in which cases the distributed boxes work together and share the blockchain and smart contracts data.

The resource management system's 150 position on the edge server 110 in the multi-tier edge-IoT system is illustrated in FIG. 1. The edge servers 110 are located between the cloud platforms and the various IoT applications that are launched in the shared infrastructure. This means that the edge servers 110 can run on different edge cloud platforms such as HomeCloud or Cloudlet.

The concept of the core resource management system 150 is to integrate a permissioned blockchain and an internal currency or "coin" system to link the edge cloud resource pool with each IoT device's account and resource usage, and hence behavior of the IoT device 160. The resource management system 150 of the edge server 110 could employ a credit-based credit management system to control how much by way of resources that a IoT device 160 can obtain from edge servers 110, based on pre-defined rules on priority, application types and past behavior. Smart contracts are used to enforce the rules and policies to regulate the behavior of the IoT device 160 in a non-deniable and automated manner. All the IoT activities and transactions are recorded into blockchain for secure data logging and auditing. As a short summary, the major contributions of the edge server 110 framework include: (1) A new resource management system 150 framework integrating permissioned blockchain and smart contracts capabilities; (2) an internal currency or coin system linking the edge cloud resource pool with IoT device accounts and resource usage behavior; (3) a credit-based resource management system to control how much resources a IoT device can obtain from edge servers; and (4) a resource-oriented and smart contracts based policy enforcement method to regulate the IoT device behavior.

Figure 2:
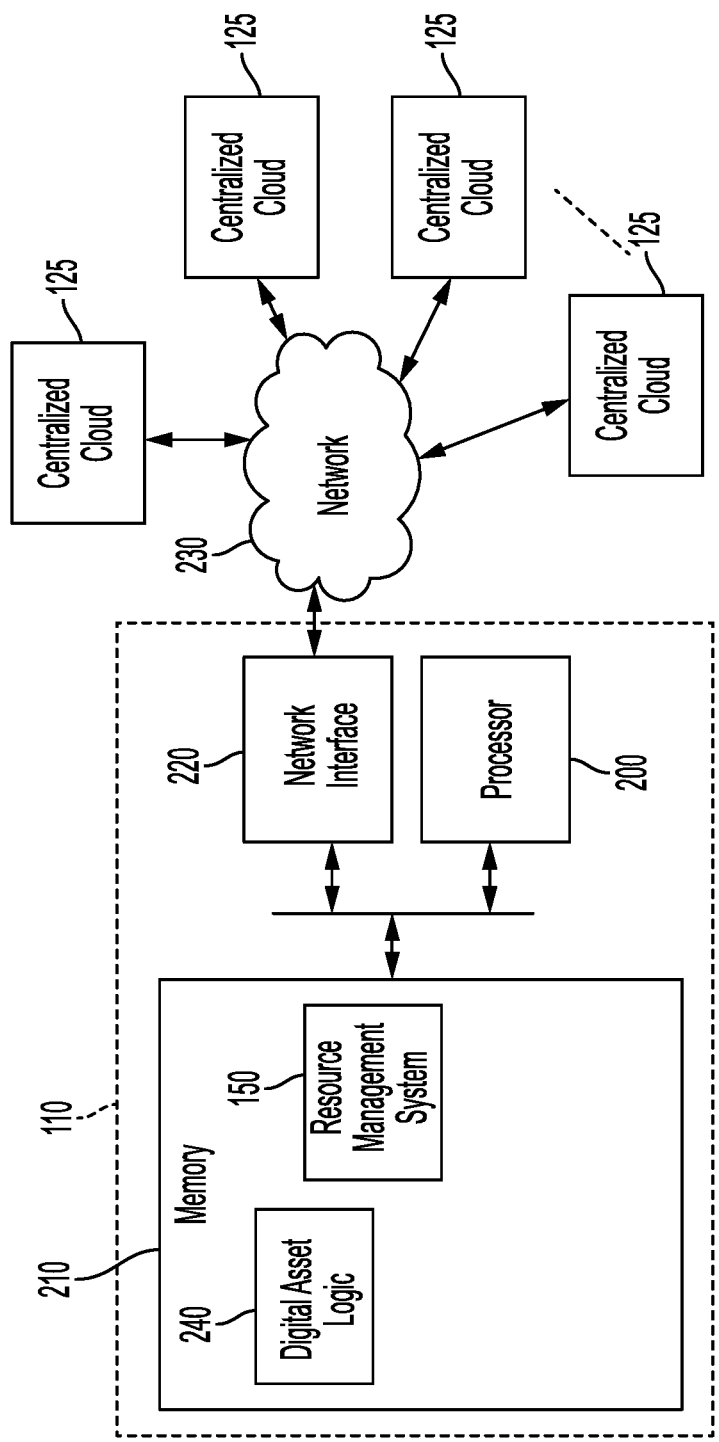
FIG. 2 illustrates an example edge server according to an embodiment of the disclosure.
Figure 10:
FIG. 10 shows a table of pricing parameters stored by the resource management system on an edge server according to an embodiment of the disclosure.

FIG. 2 illustrates an example edge server 110 connected to the internet 135 (see FIG. 10, e.g., network 230). The network 230 connection further connects the edge server 110 to the plurality of centralized clouds 125 to distribute resources and processing tasks among the multiple connected computer systems. The resource management system 150 may be implemented as part of the edge server 110 operating as one or more servers. The edge server 110 comprises a processor 200, a memory 210, and a network interface 220. The processor 200, memory 210, and network interface 220 can interconnect with each other in any of a variety of manners (e.g., via a bus, via a network, etc.)

The network interface 220 can provide an interface for the edge server 110 to a network 230. The network 230 can be any suitable communication network or combination of communication networks, such as the Internet 135 (see FIG. 1), wired and wireless telecommunication networks, etc. Through network 230, the edge server 110 can interact with the plurality of centralized clouds 125 to transfer digital commands and programs between multiple computing systems. The edge server 110 can take the form of any suitable computer (such as a desktop computer, laptop computer, tablet computer, and/or smart phone) or larger computer system and is resident on the edge cloud of the interconnected plurality of IoT devices 160 from the IoT device tier 155 of the framework (as shown in FIG. 1). The network interface 220 may take any suitable form for carrying out network interface functions, examples of which include an Ethernet interface, a serial bus interface, e.g., Firewire, USB 2.0, and so forth, a chipset, and antenna adapted to facilitate wireless communication, and/or any other interface that provides for wired and/or wireless communication. The network interface 220 may also include multiple network interfaces. Other configurations are also possible as well.

The processor 200 may comprise one or more processors such as general-purpose processors (e.g., a single-core or multi-core microprocessor), special-purpose processors (e.g., an application-specific integrated circuit or digital-signal processor, programmable-logic devices, e.g., a field programmable gate array, and so forth), that are suitable for carrying out the operations described herein.

To provide direction to a user of the resource management system 150, the edge server 110 may have a display (not shown) capable of providing a user with a graphical user interface (GUI). The display may function as a user input device. The GUI may interact with the user dependent upon the device used to access the resource management system 150. In certain embodiments, the resource management system 150 may be located on the edge server 110 and viewed on the display by executed web page code to display a website hosted by a database of the edge server 110. The website may have a URL address to access the web page code on the display. In other embodiments, the resource management system 150 may be located within the memory 210 of the edge server 110. The edge server 110 may store and execute the resource management system 150 as an application, or a mobile application for portable personal computing devices, for use by the user. In every embodiment, a user may interact with the GUI to access and execute the features of the resource management system 150. In some embodiments, this may be accomplished by inputting keyboard or mouse commands to an input device of the edge server 110, and in other embodiments, use of a touch screen or pressure sensitive display may be used to navigate the resource management system 150.

The memory 210 of the edge server 110 may comprise one or more non-transitory computer-readable storage mediums, such as volatile storage mediums, e.g., random access memory, registers, and/or cache, and/or non-volatile storage mediums, e.g., read-only memory, a hard-disk drive, a solid-state drive, flash memory, and/or an optical-storage device. The memory 210 may also be integrated in whole or in part with other components of the edge server 110. Further, the memory 210 may be local to the processor 200. It should be understood that the memory 210 (or portions of memory) could be remote from the processor 200, in which case the processor 200 may access such remote memory through network interface 220 (or some other network interface).

The memory 210 may store software programs or instructions that are executed by processor 200 during operation of the edge server 110. For example, the memory 210 may store the resource management system 150. Within the memory 210, different logical processes may be stored, which can take the form of a plurality of instructions configured for execution by processor 200. The memory 210 may also store digital asset logic 240, which can take the form of a plurality of instructions configured for execution by processor for receiving, processing, delivering, and transferring digital data to appropriate IoT devices 160 (see FIG. 1).

Figure 3:
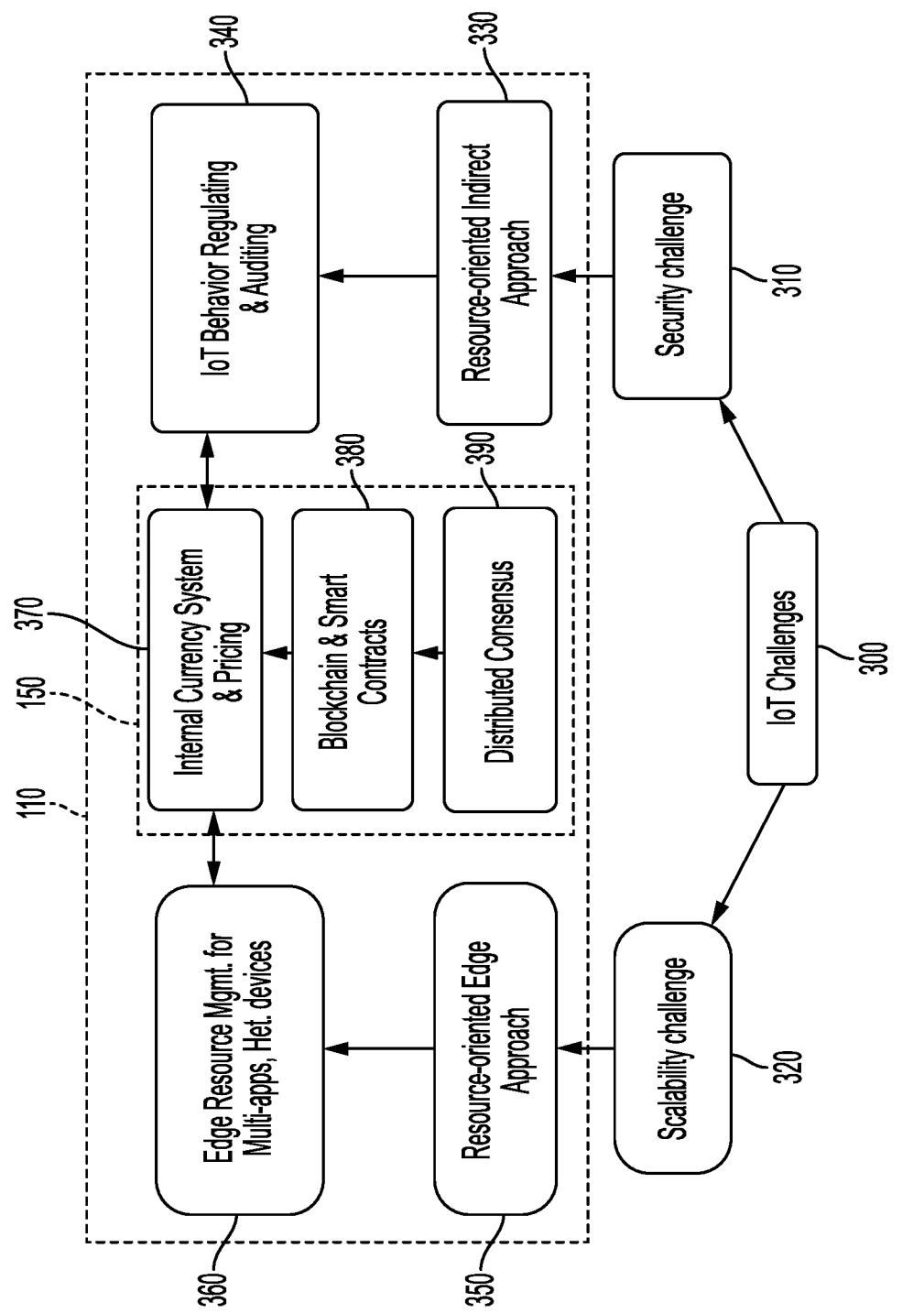
FIG. 3 shows implementation of the resource management system on an edge server according to an embodiment of the disclosure.

FIG. 3 shows a flowchart objective of the resource management system 150 within the edge server 110. The edge server 110 and edge of the computing cloud is faced with unique challenges that are local to the edge and not the entirety of the cloud itself. This mainly involves IoT challenges 300 presented by the multitude of IoT devices 160 that may connect to the edge server 110. The two main IoT challenges 300 are security challenges 310, which relate to the weakness and vulnerability of these devices 160 (see FIG. 1), and scalability challenges 320 which relate to the allocation of resources by the edge server 110 to these connected IoT devices 160. The resource management system 150 addresses both of these challenges. For the security challenges 310, the resource management system 150 provides a resource-orientated indirect approach 330 that can confine the used resources of a specific IoT device 160 to a finite amount. This leads to regulating and auditing of the IoT behavior 340 by the resource management system 150 to make sure all of the interconnected IoT devices 160 are operating within the approved limits. For scalability challenges 320, the resource management system 150 takes a resource-oriented edge approach 350. This approach looks at possible resource capabilities of the plurality of IoT devices 160 connected to the edge server 110 to determine the amount of resources that may be allocated to each IoT device 160 to allow them to operate efficiently and correctly within stored parameters of the resource management system 150. This allows for proper resource management of multiple applications 360 and resource intensive devices on the edge server 110.

The resource management system 150 addresses both the scalability challenge 320 and the security challenge 310 of the IoT devices 160. The resource management system 150 does this by containing an internal currency system 370 with pricing functionality. This allows the plurality of IoT devices 160 to receive a type of credit to run properly on the resource management system 150. The resource management system 150 also employs a blockchain and smart contracts 380. IoT devices 160 connected to the edge server 110 submit to a smart contract detailing usage requirements, and usage of the device on the edge server 110 is stored within a blockchain for easy tracking and immutable authentication. The blockchain is verified by a distributed consensus 390 by the edge server 110 to keep the resource management system 150 running smoothly and efficiently.

As stated above, blockchain usage by the resource management system 150 is an important feature employed to allocate, track, and authentic proper resource usage by the connection IoT devices 160. Blockchain networks can be generally categorized into permissionless or public blockchain, and permissioned or private blockchain. Permissionless blockchain such as the Bitcoin network is a peer-to-peer decentralized network. It is usually not controlled by any private organization and the whole network runs on broad consensus of all the members in the network. The trade-off is relatively lower transaction processing throughput and higher latency. Permissioned blockchain, however, is not a pure peer-to-peer network. The stakeholders, such as the application owners, of this type of blockchain will have a more controlled and regulated environment and higher transaction throughput. The consensus mechanisms used for permissionless and permissioned blockchain are also different.

The resource management system 150 uses a permissioned blockchain since the major goal is to support miscellaneous distributed IoT applications that generally have owners and customers. The system stakeholders need more control and higher throughput and performance. It is not necessary to run very resource-intensive proof-of-work algorithms for consensus. Moreover, sybil attacks cannot happen. It also removes the necessity of economic incentive for mining, which is usually very resource consuming in the Bitcoin network. More effective but less resource-intensive consensus protocols are available and a typical example is Practical Byzantine Fault Tolerance (PBFT) which can be used in the resource management system 150.

In the resource management system 150, the mining work is only done by the edge servers 110 that have more resources than the IoT devices 160. It is never done by the resource constrained IoT devices 160. The mining is much less resource intensive compared with permissionless blockchain network. In other words, the edge servers 110 will be in charge of monitoring the transactions and creating and appending new blocks when new transactions happen. The IoT devices 160 connected to the edge server 110 are the only blockchain and smart contracts clients. If they are resource management system-aware devices and installed with blockchain and smart contracts software, they are able to interact with the edge servers 110 and get resources and assistance for their tasks through procedures such as cloud offloading. If they are legacy devices and do not need resources from the edge servers 110, then they do not even need to install the blockchain and smart contracts software. The resource management system 150 is totally transparent to them, but still can create blockchain accounts and manage these IoT devices 160 from the back end.

The resource management system 150 uses an internal currency or coin system enabled by blockchain to link the edge resource pool with the accounts of the IoT devices 160 and resource usage behavior. The resource management system 150 consists of a novel credit-based resource management system where each of the IoT devices 160 is created and bound with a blockchain account and an initial amount of credit coins. The credit coin balance determines the ability of each of the IoT devices 60 to obtain resources from the edge servers 110. Generally speaking, the IoT device with a larger balance is afforded quicker and faster access. The edge server 110 records credits and debits and provides the necessary resources requested by the IoT device 160 based on a set of rules that takes predefined priority, application types, and past behavior into account. It is envisioned that a detailed intelligent resource provisioning mechanism may be designed at the edge clouds for the Quality of Experience (QoE) of multiple applications and heterogeneous devices being allocated by the edge server 110.

In alternate embodiments, the resource credit management mechanism of the resource management system 150 does not necessarily have to be implemented by the internal currency system. The edge server 110 can maintain a traditional credit score system and decide how to grant resources to different IoT devices 160. However, by utilizing the internal currency system, the resource management system 150 can gain a series of intrinsic security benefits that are provided with blockchain. For example, all the coin transactions are automatically logged into the secure and unmodifiable database on blockchain. This is also good for future auditing purposes. In addition, it enables smart contracts that could facilitate non-deniable and automated execution of the scheduling rules and policy enforcement in the resource management system 150. All these new benefits are not possible without the blockchain and the internal currency system.

The resource management system 150 controls the IoT devices 160 based on their behavior and resource use instead of their locations which results in better security control. This overcomes limitations in existing Edge-IoT solutions, which are usually "perimeter" based security, i.e., deploying a firewall or a filtering system between the internal and external network and by default trusting the users and nodes "inside" the network. If internal IoT devices 160 were hacked and turned to botnet, it is hard to control them.

The resource management system 150 uses a resource-oriented, smart contracts-based, and indirect security scheme for IoT behavior regulating and auditing. The resource management system 150 adopts an indirect system-level security approach, which means that it is not required that the IoT devices 160 run resource-intensive security software. Instead, the resource management system 150 monitors, controls, and regulates the behavior of IoT devices 160 based on their resource usage and activities. Based on the application types, priority, the IoT device's past behavior, the pre-programmed smart contracts enforce the resource policy automatically. This means that if some IoT devices 160 were compromised and controlled by hackers for malicious activities such as behaving erratically, making continuous resource requests that are out-of-line with its profile or application intent, or initiating Denial of Service (DoS) attacks, the smart contracts will execute automatically based on the preprogrammed policies. If such attacks are orchestrated by one of the IoT devices 160, the IoT device's currency account will run out of balance very quickly, and the resource management system 150 will be able to quickly identify, control, and contain malicious nodes or IoT devices 160 in the network without requiring them actually to be involved in specific security procedures. The resource management system 150 can easily take further measures such as putting the IoT devices 160 into the blacklist or blocking the specific IoT devices 160 from further actions. Since smart contracts are based on blockchain, all the activities are recorded into the blockchain. Thus, it is very difficult for any malicious nodes to cause sustained damage or run away with no trace. Intelligent methods to learn the history behavior pattern of the IoT devices 160 based on the data logged in the blockchain are constructed to more accurately identify and recognize potential malicious behavior.

It is understood that there are a large number of cheap IoT devices 160 that may have very limited security capabilities or are being very poorly maintained and barely upgraded. Additionally, there are some extremely incapable IoT devices 160 such as Narrowband IoT (NB-IoT) devices. Thus, it may be infeasible to run even the most lightweight blockchain client software on such primitive IoT devices 160. These devices 160 are classified as legacy devices, which are resource management system 150 unaware. The other type of devices are relatively capable enough to install with blockchain and smart contracts software and act as a blockchain client. These devices 160 are classified as non-legacy devices. Non-legacy devices are able to interact with the resource management system 150 directly and request resources and assistance from the edge servers 110. Legacy nodes are unaware of the existence of and incapable of working with edge servers 110.

The resource management system 150 framework adopts an evolutionary and backward compatible approach allowing legacy or extremely incapable IoT devices 160 to work in the new paradigm without assuming them to install new blockchain software or to be updated regularly. The resource management system 150 level capability enables measuring, monitoring, and controlling resource usage of both current and previously installed IoT devices 160. This goal is achieved through a proxy that works between the legacy IoT devices 160 and the blockchain and smart contract modules, through which the blockchain and smart contracts run transparently to the legacy devices. The proxy sniffs the activities of the legacy nodes and creates blockchain accounts for them just as for non-legacy nodes. In such cases, the resource management system 150 only monitors the behavior and takes necessary action if detecting malicious activities. It will not involve allocating edge server 110 resources for the devices 160. Through the proxy, the legacy IoT devices 160 are not required to know anything about blockchain and smart contracts but they can still be monitored, managed, and controlled by the resource management system 150 framework. Even if these legacy devices are compromised by hackers, their malicious behavior can be identified and damages can be contained.

Another important advantage of the resource management system 150 is the ability to be tailored to the need of the intended application. This allows deployment in both stand-alone modes such as in a smart home, as well as distributed modes such as a smart campus or smart city scenario. In larger scale use cases and applications such as smart campus and smart cities, multiple such resource management system 150 boxes could work in a fully distributed environment, in which cases the distributed boxes work together and share the blockchain and smart contracts data. The edge servers 110 are also able to offload and handover workloads with each other in busy situations. The edge servers 110 can also run appropriate incentive or gaming algorithms associated with their resource pool and blockchain coin accounts to optimize specific goals in revenue, cost, or service latency.

Figure 4:
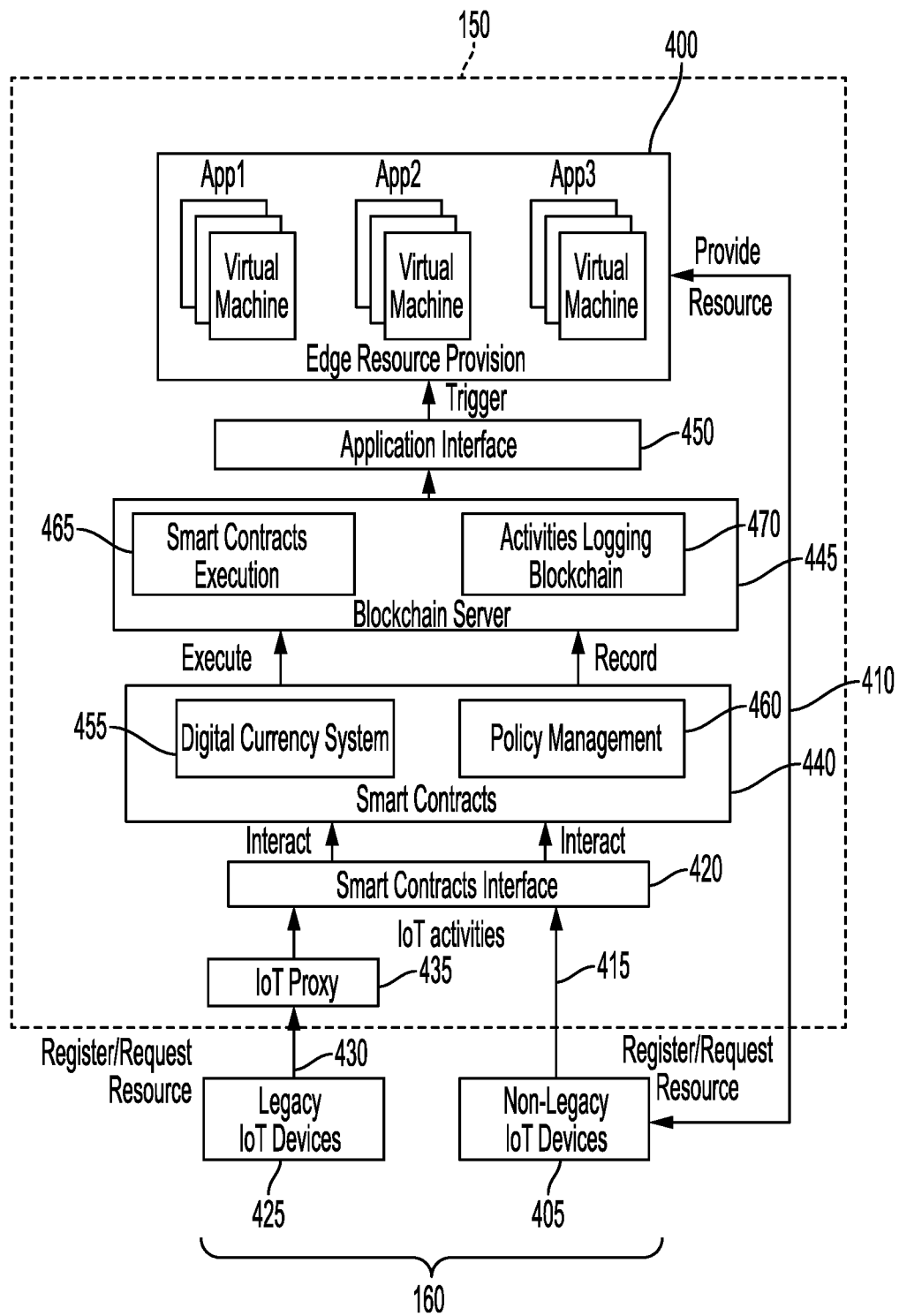
FIG. 4 shows an example framework and function model of the resource management system employed on an edge server according to an embodiment of the disclosure.

The overall system framework of the resource management system 150 is shown in FIG. 4. It can be seen that the resource management system sits between the IoT devices 160 and the edge server applications 400, and may be hosted on an edge server 110 (see FIG. 1), listening to messages and performing corresponding tasks which include device registration and device request processing. The edge server applications 400 may include virtual machine instances to be run on the edge server 110 from cloud-based applications. Non-legacy IoT devices 405 may provide resources directly to the edge server applications through a communications path 410. The non-legacy IoT devices 405 also have a second communications path 415 to the smart contracts interface 420 to register and request resources. Legacy IoT devices 425 have a single communications path 430 to the IoT proxy 435 to register and request resources. The key modules of the resource management system 150 include IoT proxy 435, smart contracts interface 420, smart contracts 440 preferably, but not necessarily, in the form of modules, blockchain server 445, and the application interface 450.

The major function of the IoT proxy 435 is to accommodate the legacy devices 425 and facilitate their interactions with the blockchain server 445 and smart contracts 440. The IoT proxy 435 listens and sniffs the legacy nodes activities and creates blockchain accounts for them. Registration is done for them in the same way as non-legacy nodes 405 so that the IoT behavior regulating and auditing functions work for them as well. Thus, all their activities are recorded in blockchain as non-legacy nodes 405. In contrast, the non-legacy devices 405 can interact with the smart contract interface 420 directly and get can get accounts created themselves through the smart contracts interface 420. Implementing this proxy server function requires appropriate sniffing software of which there are various possible solutions.

The smart contracts interface 420 is located above the IoT proxy 435 and in communication with both Non-legacy IoT devices 405 and legacy IoT devices 425 through the IoT proxy 435. When IoT activities occur such as registration, communicating between IoT devices 160 (see FIG. 1), requesting edge server resources, or sending data to outside servers on the Internet, pre-programmed and deployed smart contracts 440 will be triggered to automatically perform the corresponding operations and enforce the predefined management rules or policies. The smart contracts interface 420 builds a bridge between the IoT applications and the smart contracts 440. For example, Javascript-based APIs may be used to achieve this purpose, named Web3 protocol, to create the smart contract instances for IoT devices 160. Smart contract instances can call the functions and perform the rules that were encoded in the contracts on behalf of the specific IoT devices 160.

The smart contracts 440 is in communication with the smart contracts interface 420. The smart contracts 440, as the containers of all the rules and policies, consist of two main modules in the resource management system 150. First, a digital currency system 455 is included within the smart contracts 440 whose tokens are virtual coins that represent the trust levels of IoT devices 160 or their quotas of edge resources that can be allocated. Since each one of the IoT devices 160 is bound with a blockchain account, it will be assigned with a certain amount of coins based on its history behavior and resource type. For example, if an IoT device 160 keeps behaving well without any malicious actions, it will receive more coins to pay for more service resources. Otherwise, the IoT device 160 may be penalized by being charged more coins to receive the same services or never being rewarded. Second, a module of policy management 460 maintains all the rules that were determined at the time of their creation. The policies can be divided into two types: (1) rules to analyze behavior of IoT devices and handle harmful ones; and (2) resource allocation policies to dynamically assign resources to the requests and schedule tasks.

A blockchain server 445 is in communication with the smart contracts 440. Communication lines between the smart contracts 440 and the blockchain server 445 allow the blockchain server 445 to execute and record policy management decisions that includes the spending and reception of digital currency. The smart contracts 440 are deployed and distributed on the blockchain. The blockchain server 445 provides blockchain service where the IoT devices 160 connect to it as clients. Two functions are performed on the blockchain server 445. First, the server executes 465 the smart contracts by collecting the transactions among devices and generating the new blocks to run the code embedded in the contracts. Second, all the activities in the resource management system are recorded on the blockchain by automatically logging 470 device information, requests and other activities on blocks. This process is also called "mining" in the permissionless blockchain. However, the resource management system 150 mining process is a lot less resource-intensive due to the possible usage of more effective consensus mechanisms such as PBFT and no need for proof-of-work mechanisms to provide the consensus.

Above the blockchain server 445, an application interface 450 layer exists. After the interaction with smart contracts and blockchain, there are two possible outcomes: the requests are either rejected due to limited balance in their accounts or malicious behavior identified; or the request are accepted and granted with permission to receive extra edge resources from the edge servers 110. If the requests are granted, then the IoT devices 160 can interact with the edge server applications 400 directly, e.g., the resource-intensive work such as face recognition from the video stream can be offloaded to the edge servers 110 for faster processing. In this case, the application interface 450 opens the channels between smart contracts 440 and the edge server applications 400 to trigger resource provision based on the execution results from smart contracts 440. For example, this function may be achieved using Node.js frameworks to listen to the events on the channels and build communications for IoT devices 160 and edge cloud accordingly.

Note that in terms of delay and time cost, it is true that smart contracts 440 and operations of the blockchain server 445 are not for free and it could take a certain amount of time to finish. The good news is that registration is usually a one-time operation for a specific IoT device 160. For resource requests with the edge servers 110, after the initial request is granted, the resource provisioning and interactions happen directly between IoT devices 160 and edge servers 110, which will not cause further delay.

Once the IoT devices 160 are granted with resources and the account balance is adequate with enough balance for the requested resources, the resource management system 150 will provision resources in the edge server 110 for computation, memory, storage, networking, and intelligence accordingly. Since the application may have various requirements for computer capability, bandwidth, latency and privacy, individual virtual machines work as the basic units to meet the specific resource requests. For example, for the video-stream based face recognition application example mentioned, the edge servers 110 could spawn and launch additional virtual machines to process the video stream and obtain facial recognition. If sufficient resources are not available from this edge server 110, the resource management system 150 can coordinate with neighbor edge servers 110 to obtain additional resources. Additional incentive mechanisms and dynamic pricing schemes using game theory or auction can be useful to optimize certain goals in revenue or cost. The IoT device accounts will be charged accordingly based on the service amount and quality they receive.

Figure 5:
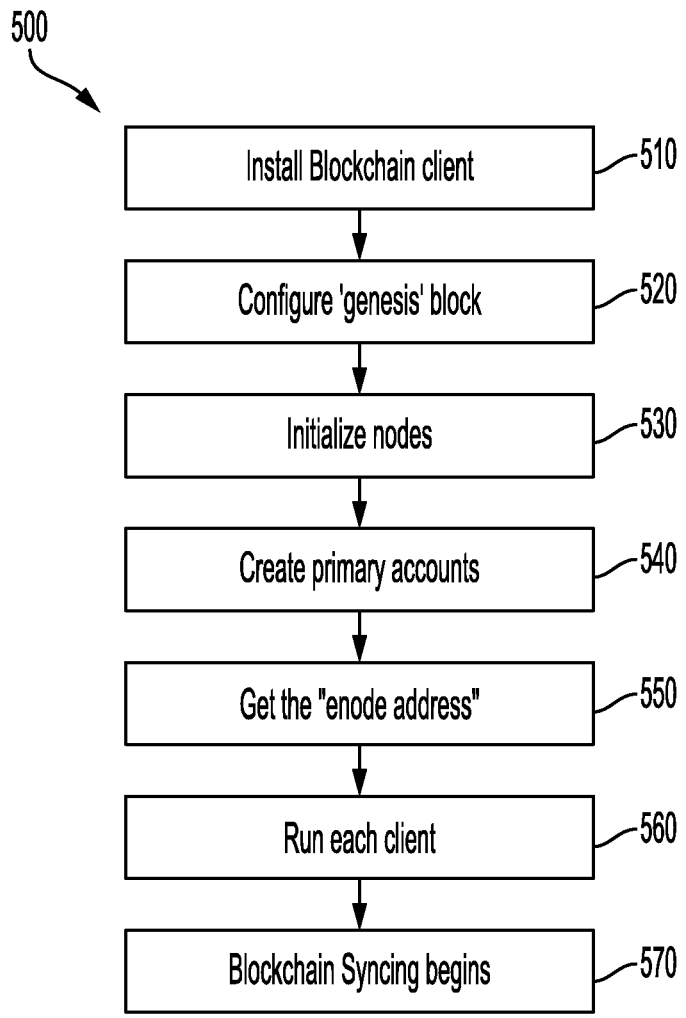
FIG. 5 provides an example flow chart of blockchain implementation by the resource management system on an edge server according to an embodiment of the disclosure.

FIG. 5 shows a flowchart of the process for blockchain deployment 500 on the resource management system 150. Blockchain implementation can be performed in a distributed way on the edge servers 110 and user devices, and are synchronized across these nodes. The start of this process begins by installing 510 blockchain software on the edge server 110, non-legacy devices 405, and the IoT proxy 435. For example, the blockchain may be built on the Ethereum platform, which is initialized by default to synchronize with a live public network. However, the resource management system 150 is configured for use on a private network. There may be certain embodiments where providing the blockchain in a live public network may be advantageous.

The blockchain begins with creating a "genesis" block 520, which holds configuration information such as the hash value of blockhead, timestamp, and difficulty of block mining. It is worth noting that the amount of difficulty makes a significant influence on the mining speed and then on the global system performance since the mining process is realized by solving a Proof-of-Work (PoW) problem with a certain difficulty. Given that only the edge server 110 is permitted to do the mining job, there is no need for a rigorous PoW mechanism to solve the consensus problem.

Therefore, the resource management system 150 sets the difficulty to a reasonable low level to balance between over quick mining to avoid storage waste and efficiency of packing transactions. To further reduce the resource consumption of the edge server 110, the implementation of an auto-mining function will only occur when there is the existence of unconfirmed transactions.

To synchronize with one another, all devices must have the same genesis block. The initialization process 530 will provide each node with same genesis configuration. Next, a primary account 540 must be created for each node and public keys are assigned for unique identification. The account gives each node a blockchain address with which it can interact with other nodes and smart contracts. To isolate the resource management system 150 from other public or private blockchains, all nodes are set to "no discovery" so they cannot connect to other peers without explicit addresses. Such isolation secures the IoT devices 160 from being hooked by external attackers. Thus, each node maintains a specific whitelist called "enode addresses" 550 which contains the public keys, IP addresses and network ports of the edge server 110 and some dependent IoT devices 160. Next the blockchain client runs 560 for each installation. Adding the enode addresses to each node's configuration will allow syncing 570 to occur. Upon completion of the above steps, each node is ready to launch. The set up nodes will begin seeking friend nodes, syncing, and shortly be prepared for use.

Figure 6:
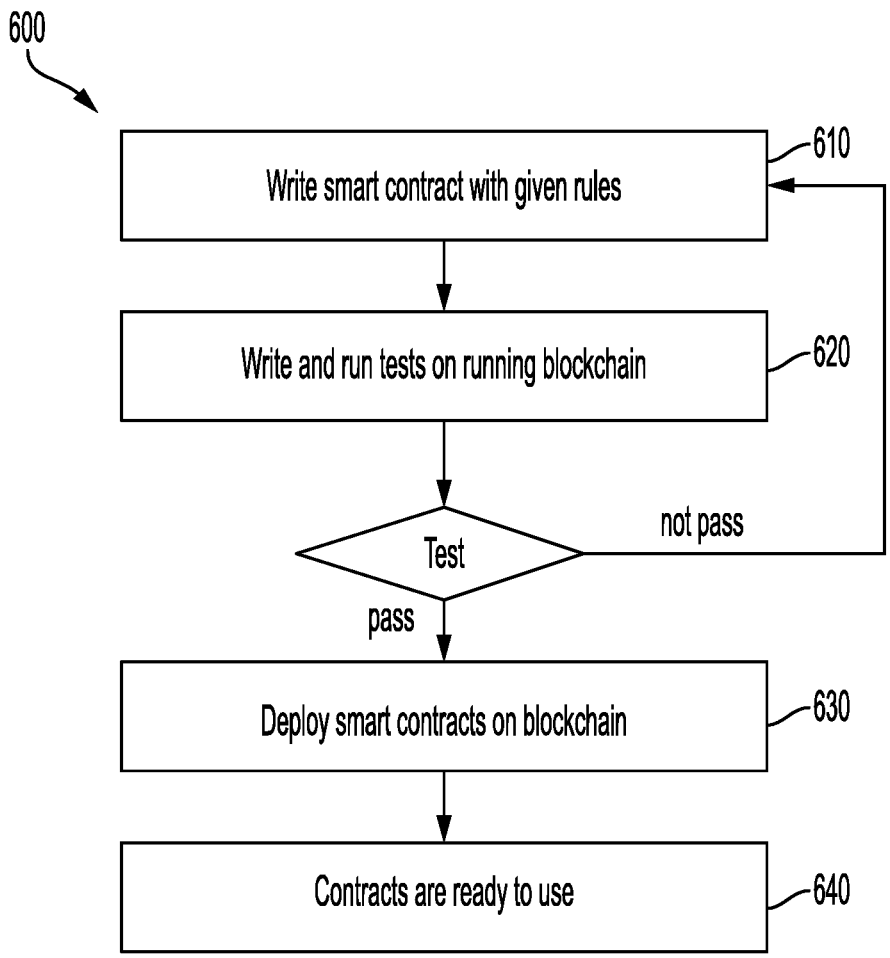
FIG. 6 provides an example flow chart of smart contract implementation by the resource management system on an edge server according to an embodiment of the disclosure.

FIG. 6 shows a flowchart of smart contract deployment 600 on the resource management system 150. The proper development of smart contracts guarantees the correct execution of management rules 610. In the resource management system 150, the key functional operations including device registration and edge resource allocation are enforced by the corresponding contracts. When developing a smart contract on the blockchain, it is important to run thorough tests 620 because once deployed 630, a contract can only be redeployed and lose any data associated with the previous version. Such a redeployment would migrate the contract to the new location and the user may be outdated with an unsupported contract. After deployment 640, smart contracts are assigned with addresses and treated as normal accounts on blockchain. In order to interact with them, a user must have a copy of the correct address to create an instance as an interface utilizing remote procedure calls (RPC) protocol. The edge server 110 is the performer to execute the functions in the contracts when the IoT devices 160 are the initiators to trigger them.

The smart contracts specify various permissions to different devices 160 where the edge server 110 owns the higher authority to access all the functions but the IoT devices 160 are only limited to some basic functions. Such a setting reduces the impact even if some weak devices are hacked to perform malicious activities. To help engage the legacy nodes 425 into the system, a proxy 435 is deployed in order to fulfill their interaction requests (see FIG. 4). Other than the direct interaction launched by the nodes, smart contracts are also able to indirectly interface with the outside world by triggering "events" which are watched by application interfaces running on the edge server 110 or other nodes on the network. Upon detecting an event of an application, some smart contract can be automatically triggered to execute the predefined tasks. For example, after the edge server 110 finishes serving one user's request, the related service data like service time would be recorded on blockchain by executing a specific contract.

Figure 7:
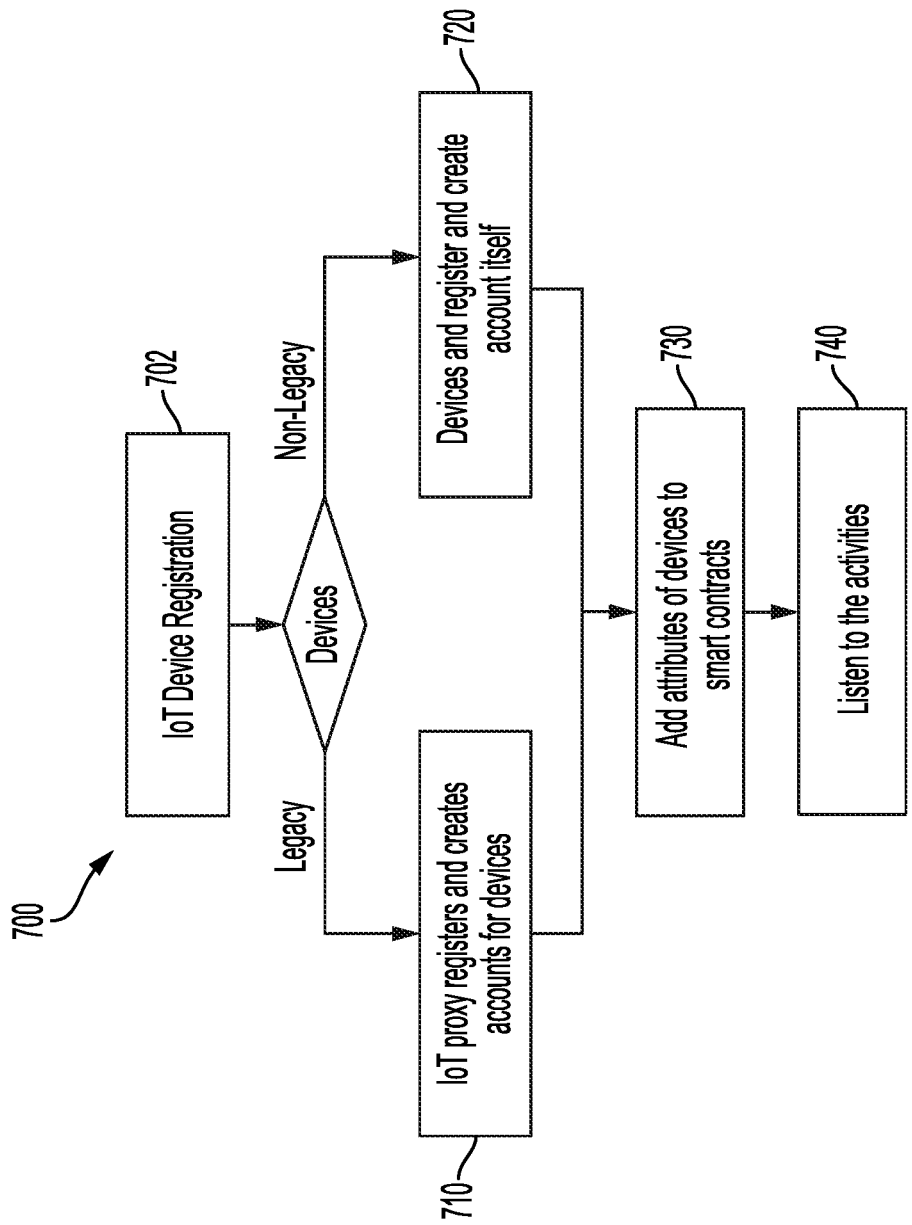
FIG. 7 provides an example flow chart of device registration by the resource management system on an edge server according to an embodiment of the disclosure.

FIG. 7 shows a flowchart of device registration 700 on the blockchain by the resource management system 150. Registration is the first step 702 to engage the IoT devices 160 to be managed and monitored in the resource management system 150. The registration starts from determining the type of devices. If there are legacy devices 710 lacking the capability to run blockchain, the proxy 435 can create accounts for each device and register the device specifications stored in the registration smart contracts. If there are non-legacy devices 720, they can interact with contracts directly. In both situations, the attributes of the IoT devices 160 are added to the smart contracts 730 followed by the step of listening to the activities 740.

The registered information can have a decisive effect on the request admission introduced in the next section. Specifically, the device specifications partially reference the Manufacturers Usage Description (MUD) files, which list the activities and communications allowed for IoT devices 160. Such specifications contain input/output data type, requests of edge resources, MAC address, IP address, network port, communication protocol, and indication flags. In addition, each IoT device of the IoT devices 160 registers a unique account address to join blockchain. Upon registration, the edge server 110 will verify the above information and take control of the modification rights of registration data. More parameters will be appended such as priority, coin balance, credit, and requests timestamp to benefit device management. As a summary, FIG. 8, indicated by numeral 800, represents the key device specifications or attributes 802 defined in the registration database which include all the devices key information, value units 810, and examples 820. Edge server 110 and IoT devices 160 have different authorities to modify the registry. In FIG. 8, the attributes marked with "*" 830 can only be updated by the edge server 110. The other basic attributes are filled up during the first registration process initialized by IoT devices 160.

Figure 9:
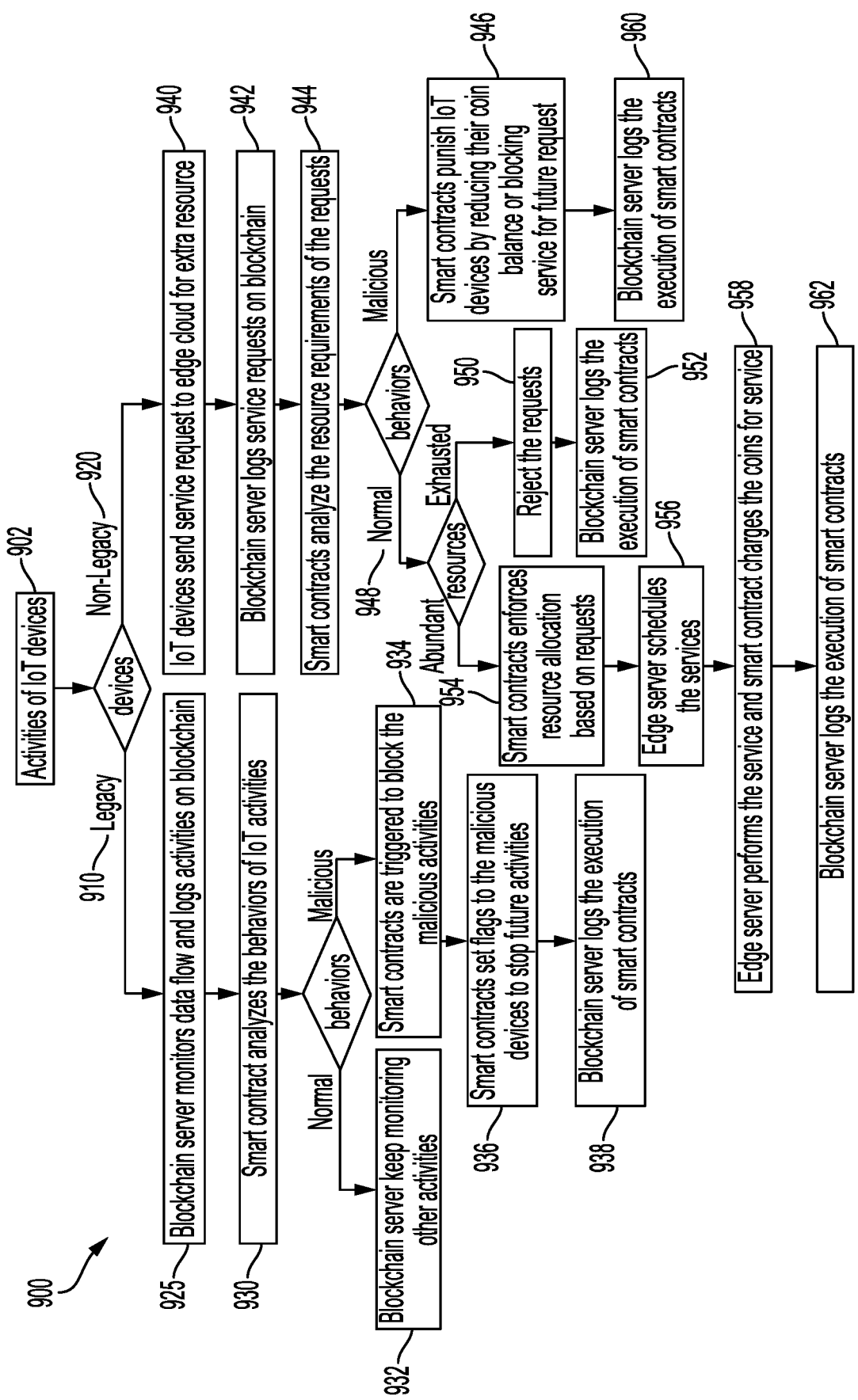
FIG. 9 provides an example flow chart of the resource management system on an edge server according to an embodiment of the disclosure.

The IoT behavior regulation and activities management is the core function of the resource management system 150 for IoT scalability and security. FIG. 9 provides a high level flowchart of operation 900 of the resource management system 150 based on an action taken by a registered IoT device 160. As seen in FIG. 9, the resource management system 150 not only regulates the activities 902 among IoT devices 160, but also provides the extra edge computing service to boost the resource-intensive applications. When the activities or the requests from IoT devices 160 are received, they are treated differently based on the type of devices, either legacy 910 or non-legacy devices 920. Legacy devices have no request for the support of edge cloud to handle the additional workload. Non-legacy devices could request to obtain edge resource and services under the enforced rules of smart contracts.

For a legacy device, the blockchain server monitors 925 its data flow to other IoT devices or outside network through a sniffer deployed on the IoT gateway such as a WiFi router. During the work process, its activities or behaviors, such as network port and data destination, are logged on blockchain. Then the smart contracts start analyzing the behavior 930 of the device by matching the above observation with the registered attributes. Based on the analyzing results, the blockchain server will choose to keep monitoring the normal behavior 932 or it will trigger 934 the smart contract to block any malicious legacy devices and update flags 936 in their registration files. Their future activities will be detected and blocked automatically without performing behavior analysis again. Finally, the execution results of the related smart contracts will be stored 938 on blockchain automatically.

For non-legacy devices, they may send service requests 940 for additional resources for resource-intensive applications such as Virtual Reality (VR) gaming. Once received, the requests are recorded 942 on blockchain in the form of transactions. Next, the resource allocation contracts 944 are executed by the edge server 110 to retrieve the attributes of the IoT devices 160 and analyze the resource requirements in the service requests. If the devices 160 are found to attempt malicious behavior, they will be penalized 946 by reducing their coin balance, lowering credit points and even blocking service for all future requests. The decisions and coin exchanges are all recorded 960 on blockchain. If the devices behave normally 948, the edge server 110 will first check the remaining available resources before further processing the requests. If the resource pool is exhausted, the requests are rejected 950 and logged 952. Otherwise, smart contracts perform the resource allocation strategy 954 based on the device types, request details and payable coins. After obtaining the decisions, the edge server starts to schedule the service 956 for the IoT devices 160 immediately. In the meantime, coins will be charged from the account of one of the IoT devices 160 when the edge service begins 958. Again, the decisions and coin exchanges are all recorded 962 on blockchain.

Resource allocation may be based on a pricing mechanism. In this specific embodiment, the optimization goal of resource allocation is to maximize the acceptance rate of user requests. In this case, the currency system plays as the connector among edge server 110, IoT devices 160 and blockchain by linking edge resources with coins. The proposed currency system is built on a pricing mechanism to decide: (a) the order of the requests that may be served, and (b) the specific service fee.

The price of a resource request dynamically changes according to the following environmental parameters: total amount of edge resources, current available edge resources, requested edge resources, and application priority.

Considering the QoE requirements, the priority of IoT applications are categorized into 4 levels, from highest to lowest: (1) Urgent monitoring: patient monitoring, people crowd sensing; (2) Latency sensitive tasks: virtual reality (VR), augmented reality (AR); (3) Reliable data transmission: bank transactions, privacy transferring; (4) Tolerant tasks: light control, sensors-based passive monitoring.

FIG. 10 shows the symbol notations 1000 and well as definitions 1010 used to calculate the price. First the unit price of resource j is defined for the request i:

$$P_{i\_j} = \alpha^{\frac{r_{i\_j}}{c_j}} * \beta^{L_i}$$

Then the total price for request i is defined as, where $c_j \in [0, w_j]$:

$$P_i = \sum_j^M r_{i\_j} * [\alpha^{\frac{r_{i\_j}}{c_j}} * \beta^{L_i}] = \beta^{L_i} \sum_j^M r_{i\_j} * \alpha^{\frac{r_{i\_j}}{c_j}}$$

Using the dynamic pricing, a heuristic request admission algorithm is proposed, although similar functioning algorithms may be used. The proposed algorithm proceeds as follows. At the beginning of timeslot t, the number of requests is N and the number of resource types is M. For each request $r_{i\_j} \in R$, judge if any kind of left edge resource $r_{i\_j}$ is less $c_j$. If yes, the request is rejected without consideration in this timeslot. If there are still enough resources, the total price of the requests will be calculated.

After all the requests are estimated, the one with the lowest price value is accepted and added to acceptance queue. Then the amounts of available resources C are updated. The rest of requests are re-estimated in the next iteration. The algorithm continues until no request can be admitted. Assume the final acceptance number of request is K, we can conclude the time complexity is $0[(N*M+1+M)*K]=0(N*M*K)$, where K<N. Therefore, the algorithm can be solved in polynomial time.

The resource management system 150 has behavior management based on credit. Behavior management aims at detecting the potentially malicious activities or requests and taking action to avoid further damage to the system. A credit system is proposed to perform the behavior management. The credit system is distinguished from other similar schemes in the IoT environment because the credit affects resource allocation on the edge server 110 instead of the cooperation between IoT devices 160. On the other hand, the credit is not directly related to price strategy for edge service but makes up the incentive or punishment scheme to restrict the request activities. The following features of the credit system are considered:

Price threshold: Assume each device of the IoT devices 160 only runs one kind of application and sends one kind of resource request, a specific threshold $P_{thres}$ is set for this device i. If $P_{total}$ exceeds $P_{thres}$, the request is regard as potential bad behavior so the device credit is reduced. Otherwise, the request is regard as good behavior and credit increases.

Request frequency so that If an IoT device of the IoT devices 160 continuously send requests in an overhigh frequency, it tends to occupy more resources than the common use then its credit is reduced.

Network port: An IoT device of the IoT devices 160 should communicate with the edge server 110 using the predefined network port in the MUD file or otherwise some abnormal behavior will happen.

Data traffic destination: An IoT device of the IoT devices 160 usually has fixed communication targets, so the strange destination indicates the possibility the IoT device is hacked or under control.

Each new registered IoT devices 160 have the same initial credits. With the changes of the real-time credit values, two kinds of management actions are proposed: (1) If the credit of a IoT device 160 has already been reduced to 0, it is blocked for any future activities; and (2) otherwise, the IoT device 160 will get various coin returned based on the credit changes. The equation is defined as follow:

$$\text{Coins}_{return} = \text{Coins}_{charged} + \Delta \text{Credit} * \eta$$

where $\Delta$Credit is the change of credit value and $\eta$ is the influence factors of changes.

It can be concluded that the ability to pay for edge service is under the control of the credit system. The better manner receives higher chance to obtain more resources.

As discussed above, the design of the resource management system 150 framework is a novel edge-IoT framework based on blockchain and smart contracts. The resource management system 150 integrates a permissioned blockchain to link the edge cloud resources with each IoT device's account, resource usage and hence behavior of the IoT device 160. The resource management system 150 uses credit-based resource management to control the resource of IoT device 160 that can be obtained from the edge server 110. Smart contracts are used to regulate the behavior of IoT device 160 and enforce policies.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A management system for electronic resources comprising:
   an edge server having a processor, a memory, and a network interface;
   at least one device in communication with the edge server via the network interface;
   a resource management system stored within the memory of the edge server; and
   wherein the resource management system is executed by a plurality of instructions carried out by the processor of the edge server, the plurality of instructions including, (1) retrieval of the at least one device's attributes by the edge server for registering the at least one device within the resource management system, (2) allocation of a digital currency for a resource request operation to the at least one device by the resource management system, (3) execution of a smart contract by the at least one device within the resource management system, the smart contact detailing an authorized parameter of the resource request operation by the resource management system, (4) recordation of the resource request operation by the at least one device on a blockchain operated and maintained by the resource management system, and (5) authorization or deauthorization of the at least one device performing the resource request operation via the smart contract by the resource management system.

2. The management system for electronic resources of claim 1, wherein the authorization or deauthorization of the at least one device is determined by a term of the smart contract.

3. The management system for electronic resources of claim 1, wherein the authorization or deauthorization of the at least one device is determined by an amount of the digital currency.

4. The management system for electronic resources of claim 1, wherein the at least one device is a non-legacy device capable of executing the smart contract for recordation within the blockchain of the resource management system.

5. The management system for electronic resources of claim 1, wherein the at least one device is a legacy device incapable of executing the smart contract and incapable of registration within the resource management system with recordation on the blockchain.

6. The management system for electronic resources of claim 5, wherein a proxy within the resource management system allows for registration of the legacy device, execution of the smart contract pertaining to the legacy device, and recordation on the blockchain for resource request operations of the legacy device.

7. The management system for electronic resources of claim 1, wherein the smart contract contains a rule to analyze behavior of the at least one device and a resource allocation policy to assign a resource to the resource request operation by the at least one device.

8. The management system for electronic resources of claim 1, wherein the digital currency of the at least one device is reduced based on the authorization of the resource request operation by the resource management system and refilled by the resource management system once a task associated with the resource request operation is complete.

9. A management system for electronic resources comprising:
   a plurality of centralized cloud computing networks;
   a plurality of edge servers connected to the plurality of centralized cloud computing networks, each edge server having a processor, a memory, and a network interface;
   a plurality of devices in communication with at least one edge server via the network interface;
   a resource management system stored within the memory of the at least one edge server in communication with the plurality of devices; and
   wherein the resource management system is executed by a plurality of instructions carried out by the processor of the at least one edge server in communication with the plurality of devices, the plurality of instructions including, (1) retrieval of at least one attribute of the plurality of devices by the edge server for registering the at least one device within the resource management system, (2) allocation of a digital currency for a resource request operation to each of the plurality of devices by the resource management system, (3) execution of a smart contract on each of the plurality of devices within the resource management system, the smart contact detailing an authorized parameter of the resource request operation by the resource management system, (4) recordation of the resource request operation by the at least one device of the plurality of devices on a blockchain operated and maintained by the resource management system, and (5) authorization or deauthorization of the at least one device of the plurality of devices performing the resource request operation via the smart contract by the resource management system.

10. The management system for electronic resources of claim 9, wherein the authorization or deauthorization of the at least one device of the plurality of devices is determined by a term of the smart contract.

11. The management system for electronic resources of claim 9, wherein the authorization or deauthorization of the at least one device of the plurality of devices is determined by an amount of the digital currency.

12. The management system for electronic resources of claim 9, wherein the plurality of devices contain at least one non-legacy device capable of executing the smart contract with recordation within the blockchain of the resource management system.

13. The management system for electronic resources of claim 9, wherein the plurality of devices contain at least one legacy device incapable of executing the smart contract and incapable of registration within the resource management system for recordation on the blockchain.

14. The management system for electronic resources of claim 13, wherein a proxy within the resource management system allows for registration of the at least one legacy device, execution of the smart contract pertaining to the at least one legacy device, and recordation on the blockchain for resource request operations of the at least one legacy device.

15. The management system for electronic resources of claim 9, wherein the smart contract contains a rule to analyze behavior of each device of the plurality of devices and a resource allocation policy to assign a resource to the resource request operation by each device of the plurality of devices.

16. The management system for electronic resources of claim 9, wherein the digital currency of each device of the plurality of devices is reduced based on the authorization of the resource request operation by the resource management system and refilled by the resource management system once a task associated with the resource request operation is complete.

17. A method for managing electronic resources in a computing network, the method comprising:
   storing a resource management system on an edge server having a processor, a memory, and a network interface;
   providing at least one device in communication with the edge server via the network interface;
   retrieving at least one device attribute of the at least one device by the edge server to register the at least one device within the resource management system;
   allocating a digital currency for a resource request operation to the at least one device by the resource management system;
   executing a smart contract by the at least one device within the resource management system, the smart contact detailing an authorized parameter of the resource request operation by the resource management system;
   recording the resource request operation by the at least one device on a blockchain operated and maintained by the resource management system; and
   authorizing or deauthorizing by way of the smart contract the at least one device performing the resource request operation by the resource management system.

18. The method for managing electronic resources in the computing network of claim 17, wherein authorizing or deauthorizing the at least one device is determined by a term of the smart contract.

19. The method for managing electronic resources in the computing network of claim 17, wherein authorizing or deauthorizing the at least one device is determined by an amount of the digital currency.

20. The method for managing electronic resources in the computing network of claim 17, wherein the smart contract contains a rule to analyze behavior of the at least one device and a resource allocation policy to assign a resource to the resource request operation by the at least one device.

* * * * *